United States Patent [19]

Funabashi et al.

[11] Patent Number: 5,895,604
[45] Date of Patent: Apr. 20, 1999

[54] RARE EARTH ACTIVATED ALKALINE EARTH METAL FLUOROHALIDE STIMULABLE PHOSPHOR OF TETRADECAHEDRAL TYPE

[75] Inventors: Makoto Funabashi; Yuji Isoda, both of Kanagawa, Japan

[73] Assignee: Fuji Photo Film Co., Ltd., Kanagawa, Japan

[21] Appl. No.: 08/925,718

[22] Filed: Sep. 9, 1997

[30] Foreign Application Priority Data

Sep. 9, 1996 [JP] Japan ................................. 8-260203

[51] Int. Cl.$^6$ ............................................. C09K 11/61
[52] U.S. Cl. ...................... 252/301.44; 252/301.4 R
[58] Field of Search ...................... 252/301.4 H, 301.4 R

[56] References Cited

U.S. PATENT DOCUMENTS 5,534,191   7/1996   Hasegawa et al. ............... 252/301.4 H

*Primary Examiner*—Melissa Koslow
*Attorney, Agent, or Firm*—Birch, Stewart, Kolasch & Birch, LLP

[57] ABSTRACT

Rare earth activated alkaline earth metal fluorohalide stimulable phosphors of tetradecahedral type are disclosed. The stimulable phosphors of tetradecahedral type are represented by the following formula (I):

$$Ba_{1-x}Ca_xFBr_{1-y}I_y \cdot aEu, bK, cCs \qquad (I)$$

in which $0<x\leq 0.03$, $0<y\leq 0.30$, $0.0001\leq a\leq 0.01$, $0<b\leq 0.001$ and $0\leq c\leq 0.001$, respectively; or the following formula (II):

$$Ba_{1-x}Ca_xFBr_{1-y}I_y \cdot aEu, bK, cLi \qquad (II)$$

in which $0<x\leq 0.03$, $0\leq y\leq 0.30$, $0.0001\leq a\leq 0.01$, $0<b\leq 0.001$ and $0\leq c\leq 0.01$, respectively. A radiation image storage panel employing the above phosphor is also disclosed.

6 Claims, No Drawings

RARE EARTH ACTIVATED ALKALINE EARTH METAL FLUOROHALIDE STIMULABLE PHOSPHOR OF TETRADECAHEDRAL TYPE

FIELD OF THE INVENTION

The present invention relates to a new rare earth activated alkaline earth metal fluorohalide stimulable phosphor in the form of tetradecahedral particles and a radiation image storage panel employing the same.

BACKGROUND OF THE INVENTION

As a method replacing a conventional radiography, radiation image recording and reproducing method utilizing a stimulable phosphor is proposed and has been practically employed. In the method, a radiation image storage panel comprising a stimulable phosphor (i.e., stimulable phosphor sheet) is employed, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the light emission to obtain electric signals; and reproducing the radiation image of the object as a visible image from the electric signals. The radiation image storage panel thus treated is subjected to a step for erasing a radiation image remaining therein, and then is stored for the next radiation image recording and reproducing procedure. Thus, the radiation image storage panel can be repeatedly employed.

In the radiation image recording and reproducing method, a radiation image is obtainable with a sufficient amount of information by applying a radiation to an object at considerably smaller dose, as compared with the conventional radiography using a combination of a radiographic film and a radiographic intensifying screen. Further, the method is very advantageous from the viewpoint of conservation of resources and economic efficiency, because the radiation image storage panel can be repeatedly used in the method, while the radiographic film is consumed for each radiographic process in the conventional radiography.

The stimulable phosphor gives a stimulated emission (i.e., light emission) when it is irradiated with stimulating rays after it is exposed to radiation. In a general radiation image storage panel, a stimulable phosphor giving a stimulated emission of a wavelength in the range of 300 to 500 nm when it is irradiated with stimulating rays of a wavelength in the range of 400 to 900 nm is employed. One of the typical examples of such generally used stimulable phosphors is a rare earth activated alkaline earth metal fluorohalide phosphor.

The radiation image storage panel employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of only an agglomerate of a stimulable phosphor, containing no binder, which is formed through deposition process or firing process. Besides them, a phosphor layer in which voids of stimulable phosphor agglomerate are impregnated with a polymer material is also known. In any of the above-described phosphor layers, the stimulable phosphor emits light (stimulated emission) when excited with stimulating rays such as visible light or infrared rays, after having been exposed to a radiation such as X-rays. Accordingly, the radiation having passed through an object or radiating from an object is absorbed by the phosphor layer of the panel in an amount proportional to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

A transparent protective film of polymer material or deposited inorganic material is generally provided on the free surface (surface not facing the support) of the phosphor layer to keep the phosphor layer from chemical deterioration or physical shock.

A radiation image storage panel employing the above-mentioned rare earth activated alkaline earth metal fluorohalide phosphor exhibits high sensitivity and gives a reproduced radiographic image with high sharpness, and therefore the stimulable phosphor is very suitable for practical use. However, according as the radiation image recording and reproducing method is getting more practically used, it is desired to further develop stimulable phosphors of high performance.

U.S. Pat. No. 5,534,191 proposes that the conventional rare earth activated alkaline earth metal fluorohalide stimulable phosphor has some problems caused by the fact that the phosphor is in the form of plate-shaped particles. In order to improve the stimulable phosphor, the U.S. Patent proposes a rare earth activated alkaline earth metal fluorohalide stimulable phosphor in the form of tetradecahedral particles represented by a certain elemental composition formula. In the publication, a radiation image storage panel employing the stimulable phosphor of tetradecahedral type is also disclosed.

SUMMARY OF THE INVENTION

The present invention has an object to provide a rare earth activated alkaline earth metal fluorohalide stimulable phosphor of tetradecahedral type superior to the above stimulable phosphor of tetradecahedral type disclosed in U.S. Pat. No. 5,534,191, from the viewpoint of practical performance (such as luminance of stimulated emission, erasing property, image-remaining property, fading property and X-ray afterglow) for the radiation image recording and reproducing method.

The present invention resides in a rare earth activated alkaline earth metal fluorohalide stimulable phosphor in the form of tetradecahedral particles represented by the following formula (I):

$$Ba_{1-x}Ca_xFBr_{1-y}I_y \cdot aEu, bK, cCs \qquad (I)$$ 

in which $0 < x \leq 0.03$, $0 < y \leq 0.30$, $0.0001 \leq a \leq 0.01$, $0 < b \leq 0.001$ and $0 \leq c \leq 0.001$, respectively; and a radiation image panel employing said stimulable phosphor.

The numbers of x, y, a, b and c in the formula (I) can be determined by analyzing the prepared phosphor. The composition ratio of the prepared phosphor does not equal to that of the starting materials because the composition ratio varies in the course of firing procedure in the production process of the phosphor.

The numbers of x, y, a, b and c in the formula (I) preferably satisfy the conditions of $0.001 \leq x \leq 0.03$, $0.10 \leq y \leq 0.20$, $0.001 \leq a \leq 0.01$, $0 < b \leq 0.0003$ and $0 < c \leq 0.0001$, respectively. The stimulable phosphor of the formula (I) may contain, if desired, other alkaline metal (e.g., lithium), other alkaline earth metal (e.g., strontium) and/or other elements, provided that they do not change the basic property of the stimulable phosphor.

The present invention also resides in a rare earth activated alkaline earth metal fluorohalide stimulable phosphor in the form of tetradecahedral particles represented by the following formula (II):

$$Ba_{1-x}Ca_xFBr_{1-y}I_y:aEu,bK,cLi \quad (II)$$

in which $0 < x \leq 0.03$, $0 \leq y \leq 0.30$, $0.0001 \leq a \leq 0.01$, $0 < b \leq 0.001$ and $0 \leq c \leq 0.01$, respectively; and a radiation image panel employing said stimulable phosphor.

The numbers of x, y, a, b and c in the formula (II) preferably satisfy the conditions of $0.001 \leq x \leq 0.03$, $y=0$, $0.001 \leq a \leq 0.01$, $0.00001 \leq b \leq 0.001$ and $0 < c \leq 0.01$, respectively. The stimulable phosphor of the formula (II) may contain, if desired, other alkaline metal (e.g., cesium), other alkaline earth metal (e.g., strontium) and/or other elements unless they changes the basic property of the stimulable phosphor.

DETAILED DESCRIPTION OF THE INVENTION

The rare earth activated alkaline earth metal fluorohalide stimulable phosphor in the form of tetradecahedral particles according to the invention can be prepared from halides of various metals (e.g., barium, calcium, europium, potassium, cesium and lithium) in the same manner as described in U.S. Pat. No. 5,534,191.

The stimulable phosphor of tetradecahedral type according to the invention is in the form of particles of polyhedral shape intermediate between regular hexahedron and regular octahedron, and the particles usually have an aspect ratio of 1.0-5.0. The concrete shape of the particles is the same as shown in the photograph in U.S. Pat. No. 5,534,191.

The radiation image storage panel of the invention has a stimulable phosphor layer containing the stimulable phosphors of tetradecahedral type represented by one of the above formulas, and the stimulable phosphor layer usually comprises a binder and the stimulable phosphor dispersed therein. The stimulable phosphor layer may further contain other stimulable phosphors and/or additives such as colorant.

A process for producing the radiation image storage panel of the invention is described below with respect to an example of the panel having the phosphor layer which comprises a binder and the stimulable phosphor dispersed therein.

A stimulable phosphor layer can be formed on the support in the known manner as follows.

In the first place, the stimulable phosphor and a binder are added to an appropriate solvent, and they are well mixed to prepare a coating dispersion for the formation of a phosphor layer in which the stimulable phosphor particles are uniformly dispersed in a binder solution. The ratio between the binder and the phosphor in the coating dispersion can be determined according to the characteristics of the desired radiation image storage panel and the nature of the employed phosphor. Generally, the ratio is within the range of from 1:1 to 1:100 (binder:phosphor, by weight), preferably from 1:8 to 1:40. The coating dispersion thus prepared is applied evenly onto the surface of a support to form a layer of the coating dispersion. The coating procedure can be carried out by the conventional method such as a method of using a doctor blade, a roll coater or a knife coater.

A support material employable in the invention can be selected from those employed in the known radiation image storage panels. In the preparation of the known radiation image storage panel, one or more additional layers are occasionally provided between the support and the phosphor layer, so as to enhance the adhesion between the support and the phosphor layer, or to improve the sensitivity of the panel or the quality of a reproduced image (sharpness and graininess). For example, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support, and the constitution thereof can be optionally selected depending upon the purpose of the radiation image storage panel. The phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of a radiation image.

The coated layer of the dispersion is dried to form a stimulable phosphor layer on the support. The thickness of the phosphor layer varies depending upon the characteristics of the aimed radiation image storage panel, the nature of the phosphor, the ratio between the binder and the phosphor, etc. Generally, the thickness of the phosphor layer is in the range of 20 μm to 1 mm, preferably in the range of 50 to 500 μm. The phosphor layer can be provided on the support by the method other than that given in the above. For example, the phosphor layer is initially prepared on a sheet (temporary support) such as a glass plate, metal plate or plastic sheet using the aforementioned coating dispersion, and thus prepared phosphor layer is then over-laid on the genuine support by pressing or using an adhesive agent.

As is described above, a protective film is usually provided on the phosphor layer. The protective film can be formed by evenly coating the surface of the phosphor layer with a solution prepared by dissolving a transparent organic polymer material such as cellulose derivative or polymethyl methacrylate in an appropriate solvent. Alternatively, the protective film can be provided on the phosphor layer by beforehand preparing a film for forming a protective film from a plastic sheet made of polyethylene terephthalate, etc. or a transparent glass sheet, followed by placing and fixing it onto the phosphor layer with an appropriate adhesive agent. Otherwise, the protective film can be also provided by depositing an inorganic compound. The protective film also may be formed from an applied film of fluororesin soluble in an organic solvent, and may contain perfluoroolefin resin powder or silicone resin powder dispersed therein.

For the purpose of enhancing the sharpness of the obtained image, at least any one of the above-mentioned film and layers may be colored with such a colorant as absorbs only stimulating rays and not absorbs stimulated emission. Otherwise, an intermediate layer colored with the above colorant may be independently provided.

The radiation image storage panel of the invention having the phosphor layer which comprises a binder and the rare earth activated alkaline earth metal fluorohalide stimulable phosphor of tetradecahedral type represented by the above formula (I) or (II) dispersed therein can be produced in the above-described manner.

EXAMPLE 1

Preparation of $Ba_{0.993}Ca_{0.007}FBr_{0.85}I_{0.15}$:0.004Eu, 0.00006K,0.00002Cs (1) 1,150 mL of $BaBr_2$ aqueous solution (2.5 mol/l), 36 mL of aqueous $EuBr_3$ solution (0.2 mol/l), 2.97 g of KBr, 3.40 g of $CaBr_2 \cdot 2H_2O$ and 1,812 mL of water were placed in a 4,000 mL volume reactor. The mother reaction liquid (concentration of $BaBr_2$:0.96 mol/L) in the reactor was kept at 60° C. and stirred with a screw-type stirrer (diameter: 60 mm) at 5,000 r.p.m.

288 mL of aqueous $NH_4F$ solution (2.5 mol/L) was introduced into the mother liquid under stirring at 60° C. at a rate of 4.8 mL/minute by means of a roller pump, to give a precipitate. After that, the mother liquid was further stirred at 60° C. for 2 hours to ripen the precipitate. The ripened precipitate was filtered off, washed with 2 L of methanol and dried in vacuo at 120° C. for 4 hours to obtain 320 g of a precursor crystalline product of the phosphor (hereinafter referred to as "BFB crystal"). The obtained precursor crystalline product was observed with a scanning electron microscope to find that most of the crystalline particles had tetradecahedral shape. The mean grain size of the crystal particles was also measured with a grain size distribution analyzer of light diffraction type (Horiba, Ltd.: LA-500) and found to be 6.5 μm.

(2) 2,850 mL of aqueous $BaI_2$ solution (4.0 mol/L), 90 mL of aqueous $EuI_3$ solution (0.2 mol/l) and 60 mL of water were placed in a 4,000 mL-volume reactor. The mother reaction liquid (concentration of $BaI_2$:3.80 mol/L) in the reactor was kept at 60° C. and stirred with a screw-type stirrer (diameter: 60 mm) at 500 r.p.m.

720 mL of aqueous HF solution (5 mol/L) was introduced into the mother liquid under stirring at 60° C. at a rate of 12 mL/minute by means of a roller pump, to form a precipitate. After that, the mother liquid was further stirred at 60° C. for 2 hours to ripen the precipitate. The ripened precipitate was filtered off, washed with 2 L of isopropanol and dried in vacuo at 120° C. for 4 hours to obtain 1,000 g of a precursor crystalline product of the phosphor (hereinafter referred to as "BFI crystal"). The obtained precursor crystalline product was observed with the scanning electron microscope to find that most of the crystalline particles had tetradecahedral shape. The mean grain size of the crystal particles was also measured with the grain size distribution analyzer of light diffraction type and found to be 6.5 μm.

(3) 1.0 g of alumina of super-fine grain powder, 165 g of BFB crystals, 35 g of BFI crystals and 0.10 g of CsBr were well mixed by means of a mixer so that the alumina powder might be uniformly attached to the surface of the crystals and the alumina powder prevents the crystal particles from deformation and/or agglomeration caused by sintering in the firing process to keep the initial grain size distribution. 100 g of the prepared mixture was placed in an alumina boat, and was fired in a tube furnace at 820° C. for 3 hours under a nitrogen gas atmosphere to obtain the desired europium activated barium fluorobromide phosphor particles. The obtained phosphor particles were observed with the scanning electron microscope to find that most of the particles had the same tetradecahedral shape as the precursor crystalline product.

EXAMPLE 2

Preparation of $Ba_{0.993}Ca_{0.007}FBr_{0.85}I_{0.15}$:0.004Eu, 0.0002K,0.00002Cs The procedure of Example 1 was repeated except that the amount of KBr was changed to 8.91 g in the step (1) to prepare the desired europium activated barium fluorobromide phosphor particles of tetradecahedral type.

EXAMPLE 3

Preparation of $Ba_{0.993}Ca_{0.007}FBr_{0.85}I_{0.15}$:0.004Eu, 0.001K,0.00002Cs The procedure of Example 1 was repeated except that the amount of KBr was changed to 29.7 g in the step (1) to prepare the desired europium activated barium fluorobromide phosphor particles of tetradecahedral type.

EXAMPLE 4

Preparation of $Ba_{0.993}Ca_{0.007}FBr_{0.85}I_{0.15}$:0.004Eu, 0.00006K

The procedure of Example 1 was repeated except that CsBr was not added in the step (3) to prepare the desired europium activated barium fluorobromide phosphor particles of tetradecahedral type.

EXAMPLE 5

Preparation of $Ba_{0.933}Ca_{0.007}FBr_{0.85}I_{0.15}$:0.004Eu, 0.00006K,0.00001Cs The procedure of Example 1 was repeated except that the amount of CsBr was changed to 0.05 g in the step (3) to prepare the desired europium activated barium fluorobromide phosphor particles of tetradecahedral type.

EXAMPLE 6

Preparation of $Ba_{0.933}Ca_{0.007}FBr_{0.85}I_{0.15}$:0.004Eu, 0.00006K,0.0002Cs The procedure of Example 1 was repeated except that the amount of CsBr was changed to 0.40 g in the step (3) to prepare the desired europium activated barium fluorobromide phosphor particles of tetradecahedral type.

EXAMPLE 7

Preparation of $Ba_{0.999}Ca_{0.001}FBr_{0.85}I_{0.15}$:0.004Eu, 0.00006K,0.00002Cs The procedure of Example 1 was repeated except that the amount of $CaBr_2 \cdot 2H_2O$ was changed to 0.34 g in the step (1) to prepare the desired europium activated barium fluorobromide phosphor particles of tetradecahedral type.

EXAMPLE 8

Preparation of $Ba_{0.970}Ca_{0.030}FBr_{0.85}I_{0.15}$:0.004Eu, 0.00006K,0.00002Cs The procedure of Example 1 was repeated except that the amount of $CaBr_2 \cdot 2H_2O$ was changed to 10.20 g in the step (1) to prepare the desired europium activated barium fluorobromide phosphor particles of tetradecahedral type.

EXAMPLE 9

Preparation of $Ba_{0.993}Ca_{0.007}FBr_{0.90}I_{0.10}$:0.004Eu, 0.00006K,0.00002Cs The procedure of Example 1 was repeated except that the amounts of BFB crystals and BFI crystals were changed to 174 g and 26 g, respectively, in the step (3) to prepare the desired europium activated barium fluorobromide phosphor particles of tetradecahedral type.

EXAMPLE 10

Preparation of $Ba_{0.993}Ca_{0.007}FBr_{0.70}I_{0.30}$:0.004Eu, 0.00006K,0.00002Cs The procedure of Example 1 was repeated except that the amounts of BFB crystals and BFI crystals were changed to 136 g and 64 g, respectively, in the step (3) to prepare the desired europium activated barium fluorobromide phosphor particles of tetradecahedral type.

EXAMPLE 11

Preparation of $Ba_{0.993}Ca_{0.007}FBr_{0.85}I_{0.15}$:0.004Eu, 0.00006K,0.00002Cs The procedure of Example 1 was repeated except that the amount of alumina in the form of super-fine grain powder was changed to 0.6 g in the step (3) to prepare the desired europium activated barium fluorobromide phosphor particles of tetradecahedral type.

EXAMPLE 12

Preparation of $Ba_{0.993}Ca_{0.007}FBr_{0.85}I_{0.15}$:0.004Eu, 0.00006K,0.00002Cs The procedure of Example 1 was repeated except that the amount of alumina in the form of super-fine grain powder was changed to 2.0 g in the step (3) to prepare the desired europium activated barium fluorobromide phosphor particles of tetradecahedral type.

EXAMPLE 13

Preparation of $Ba_{0.993}Ca_{0.007}FBr_{0.85}I_{0.15}$:0.0001Eu, 0.00006K,0.00002Cs The procedure of Example 1 was repeated except that the concentration of aqueous $EuBr_3$ solution in the step (1) was changed to 0.004 mol/l and the concentration of aqueous $EuI_3$ solution in the step (2) was changed to 0.004 mol/L to prepare the desired europium activated barium fluorobromide phosphor particles of tetradecahedral type.

EXAMPLE 14

Preparation of $Ba_{0.993}Ca_{0.007}FBr_{0.85}I_{0.15}$:0.010Eu, 0.00006K,0.00002Cs The procedure of Example 1 was repeated except that the concentration of aqueous $EuBr_3$ solution in the step (1) was changed to 0.4 mol/L and the concentration of aqueous $EuI_3$ solution in the step (2) was changed to 0.4 mol/L to prepare the desired europium activated barium fluorobromide phosphor particles of tetradecahedral type.

COMPARISON EXAMPLE 1

Preparation of $Ba_{0.993}Ca_{0.007}FBr_{0.85}I_{0.15}$:0.004Eu, 0.00002Cs

The procedure of Example 1 was repeated except that KBr was not added in the step (1) to prepare the desired europium activated barium fluorobromide phosphor particles of tetradecahedral type.

COMPARISON EXAMPLE 2

Preparation of $Ba_{0.993}Ca_{0.007}FBr_{0.85}I_{0.15}$:0.004Eu, 0.002K,0.00002Cs The procedure of Example 1 was repeated except that the amount of KBr was changed to 59.4 g in the step (1) to prepare the desired europium activated barium fluorobromide phosphor particles of tetradecahedral type.

COMPARISON EXAMPLE 3

Preparation of $Ba_{0.993}Ca_{0.007}FBr_{0.85}I_{0.15}$:0.004Eu, 0.00006K,0.002Cs The procedure of Example 1 was repeated except that the amount of CsBr was changed to 4.0 g in the step (3) to prepare the desired europium activated barium fluorobromide phosphor particles of tetradecahedral type.

COMPARISON EXAMPLE 4

Preparation of $BaFBr_{0.85}I_{0.15}$:0.004Eu,0.00006K, 0.00002Cs

The procedure of Example 1 was repeated except that $CaBr_2 \cdot 2H_2O$ was not added in the step (1) to prepare the desired europium activated barium fluorobromide phosphor particles of tetradecahedral type.

COMPARISON EXAMPLE 5

Preparation of $Ba_{0.950}Ca_{0.050}FBr_{0.85}I_{0.15}$:0.004Eu, 0.00006K,0.00002Cs The procedure of Example 1 was repeated except that the amount of $CaBr_2 \cdot 2H_2O$ was changed to 17.0 g in the step (1) to prepare the desired europium activated barium fluorobromide phosphor particles of tetradecahedral type.

COMPARISON EXAMPLE 6

Preparation of $Ba_{0.993}Ca_{0.007}FBr$:0.004Eu, 0.00006K,0.00002Cs

The procedure of Example 1 was repeated except that the amount of BFB crystals was changed to 200 g and BFI crystals were not used in the step (3) to prepare the desired europium activated barium fluorobromide phosphor particles of tetradecahedral type.

COMPARISON EXAMPLE 7

Preparation of $Ba_{0.993}Ca_{0.007}FBr_{0.60}I_{0.40}$:0.004Eu, 0.00006K,0.00002Cs The procedure of Example 1 was repeated except that the amounts of BFB crystals and BFI crystals were changed to 116 g and 84 g, respectively, in the step (3) to prepare the desired europium activated barium fluorobromide phosphor particles of tetradecahedral type.

COMPARISON EXAMPLE 8

Preparation of $Ba_{0.993}Ca_{0.007}FBr_{0.85}I_{0.15}$:0.00005Eu, 0.00006K,0.00002Cs The procedure of Example 1 was repeated except that the concentration of aqueous $EuBr_3$ solution in the step (1) was changed to 0.002 mol/l and the concentration of aqueous $EuI_3$ solution in the step (2) was changed to 0.002 mol/L to prepare the desired europium activated barium fluorobromide phosphor particles of tetradecahedral type.

COMPARISON EXAMPLE 9

Preparation of $Ba_{0.993}Ca_{0.007}FBr_{0.85}I_{0.15}$:0.020Eu, 0.00006K,0.00002Cs The procedure of Example 1 was repeated except that the concentration of aqueous $EuBr_3$ solution in the step (1) was changed to 0.8 mol/L and the concentration of aqueous EuI$_3$ solution in the step (2) was changed to 0.8 mol/L to prepare the desired europium activated barium fluorobromide phosphor particles of tetradecahedral type.

EVALUATION OF EUROPIUM ACTIVATED BARIUM FLUOROBROMIDE PHOSPHOR OF TETRADECAHEDRAL TYPE

Various properties of the europium activated barium fluorobromide phosphors of tetradecahedral type prepared by the above examples and comparison examples were evaluated in the following manner.

(1) Luminance of Stimulated Emission (Photo-Stimulated Luminance; PSL)

A predetermined amount of the sample phosphor was exposed to X-rays at 80 KVp in an amount of 200 mR, and after 10 seconds, excited with the light of semiconductor laser (wavelength: 680 nm) in an amount of 4.8 J/m$^2$. The stimulated emission emitted by the phosphor having passed through an optical filter (B-410), and was detected by a photomultiplier to measure a luminance of stimulated emission (photo-stimulated luminance; PSL). The measured luminance (PSL) of each phosphor is shown in Table 1 as relative value. A phosphor exhibiting a high PSL value is preferred.

(2) Erasing Property

After the sample phosphor was subjected to the above PSL measurement (1), the phosphor was sequentially irradiated with a light of white fluorescence lamps through a sharp-cut optical filter (SC-46) in an amount of 2,000,000 Lux·second, and then the procedure of the above PSL measurement (1) was repeated except that the phosphor was not exposed to X-rays to measure a PSL value after erasure. The ratio between the PSL value of the measurement (1) (initial PSL) and the PSL value after erasure (PSL after erasure) was calculated. The ratio (PSL after erasure/initial PSL) of each phosphor is shown in Table 1 as erasure value. A phosphor exhibiting a low erasure value is preferred.

(3) Image-Remaining Property

After the above procedure (2) was complete, the phosphor was stored at 60° C. in a dark place for 24 hours and then the procedure of the above PSL measurement (1) was repeated except that the phosphor was not exposed to X-rays to measure a PSL value after storage. The ratio between the PSL value of the measurement (1) (initial PSL) and the PSL value after storing (PSL after storage) was calculated. The ratio (PSL after storage/initial PSL) of each phosphor is shown in Table 1 as image remaining value. A phosphor exhibiting a low image remaining value is preferred.

(4) Fading Property

After the sample phosphor was subjected to the above PSL measurement (1), the phosphor was stored at 32° C. in a dark place for 1 hour and then the procedure of the above PSL measurement (1) was repeated except that the phosphor was not exposed to X-rays to measure a PSL value after storing. The ratio between the PSL value of the measurement (1) (initial PSL) and the PSL value after storing (PSL after fading) was calculated. The value of the ratio (PSL after fading/initial PSL)×100 is shown in Table 1 as fading value. A phosphor exhibiting a high fading value is preferred.

(5) X-Ray Afterglow

A predetermined amount of the sample phosphor was exposed to X-rays at 80 KVp in an amount of 200 mR. After 46 seconds, the afterglow emitted by the phosphor having passed through an optical filter (B-410), and was detected by a photomultiplier to measure a luminance of afterglow. The value of $\log_{10}$(luminance of afterglow/initial PSL) was calculated to obtain a value of X-ray afterglow. The obtained value of X-ray afterglow is shown in Table 1 as relative value. A phosphor exhibiting a low value is preferred.

TABLE 1

| | PSL | erasure value | image remaining value | fading value | X-ray afterglow |
|---|---|---|---|---|---|
| Ex.1 | 70 | $1.3 \times 10^{-5}$ | $8.4 \times 10^{-6}$ | 72 | −4.45 |
| Ex.2 | 74 | $1.7 \times 10^{-5}$ | $1.1 \times 10^{-5}$ | 68 | −4.41 |
| Ex.3 | 75 | $1.1 \times 10^{-5}$ | $8.0 \times 10^{-6}$ | 60 | −4.30 |
| Ex.4 | 62 | $1.8 \times 10^{-5}$ | $1.0 \times 10^{-5}$ | 83 | −4.30 |
| Ex.5 | 68 | $1.5 \times 10^{-5}$ | $1.0 \times 10^{-5}$ | 75 | −4.44 |
| Ex.6 | 68 | $1.4 \times 10^{-5}$ | $9.0 \times 10^{-6}$ | 70 | −4.43 |
| Ex.7 | 71 | $1.2 \times 10^{-5}$ | $8.0 \times 10^{-6}$ | 65 | −4.45 |
| Ex.8 | 61 | $1.1 \times 10^{-5}$ | $8.0 \times 10^{-6}$ | 73 | −4.43 |
| Ex.9 | 63 | $1.5 \times 10^{-5}$ | $1.3 \times 10^{-5}$ | 70 | −4.38 |
| Ex.10 | 57 | $2.1 \times 10^{-5}$ | $4.2 \times 10^{-5}$ | 69 | −3.94 |
| Ex.11 | 72 | $1.1 \times 10^{-5}$ | $8.4 \times 10^{-6}$ | 68 | −4.42 |
| Ex.12 | 53 | $1.5 \times 10^{-5}$ | $2.0 \times 10^{-5}$ | 73 | −4.10 |
| Ex.13 | 62 | $2.6 \times 10^{-5}$ | $2.6 \times 10^{-5}$ | 76 | −3.87 |
| Ex.14 | 74 | $1.4 \times 10^{-5}$ | $7.9 \times 10^{-6}$ | 69 | −4.58 |
| Com.Ex.1 | 48 | $1.4 \times 10^{-5}$ | $9.3 \times 10^{-6}$ | 75 | −4.50 |
| Com.Ex.2 | 75 | $1.5 \times 10^{-5}$ | $1.2 \times 10^{-5}$ | 45 | −3.55 |
| Com.Ex.3 | 73 | $1.2 \times 10^{-5}$ | $1.0 \times 10^{-5}$ | 55 | −4.38 |
| Com.Ex.4 | 44 | $1.6 \times 10^{-5}$ | $9.6 \times 10^{-6}$ | 63 | −4.22 |
| Com.Ex.5 | 45 | $1.6 \times 10^{-5}$ | $9.0 \times 10^{-6}$ | 78 | −4.40 |
| Com.Ex.6 | 43 | $9.0 \times 10^{-6}$ | $3.6 \times 10^{-6}$ | 31 | −4.06 |
| Com.Ex.7 | 49 | $2.8 \times 10^{-5}$ | $9.0 \times 10^{-5}$ | 69 | −3.61 |
| Com.Ex.8 | 30 | $5.0 \times 10^{-5}$ | $1.0 \times 10^{-4}$ | 80 | −3.35 |
| Com.Ex.9 | 72 | $1.5 \times 10^{-5}$ | $8.0 \times 10^{-6}$ | 50 | −4.43 |

The values in Table 1 show the following facts.

Comparison Example 1 shows that the phosphor containing no potassium exhibits low luminance of stimulated emission.

Comparison Example 2 shows that the phosphor containing too much potassium exhibits unpreferable properties in view of fading property and X-ray afterglow.

Comparison Example 3 shows that the phosphor containing too much cesium exhibits unpreferable fading property.

Comparison Example 4 shows that the phosphor containing no calcium exhibits low luminance of stimulated emission.

Comparison Example 5 shows that the phosphor containing too much calcium also exhibits low luminance of stimulated emission.

Comparison Example 6 shows that the phosphor containing no iodine exhibits low luminance of stimulated emission and unpreferable fading property.

Comparison Example 7 shows that the phosphor containing too much iodine exhibits low luminance of stimulated emission and unpreferable properties with respect to image-remaining property and X-ray afterglow.

Comparison Example 8 shows that the phosphor containing too less europium exhibits low luminance of stimulated emission and unpreferable properties with respect to erasing property, image-remaining property and X-ray afterglow.

Comparison Example 9 shows that the phosphor containing too much europium exhibits unpreferable fading property.

EXAMPLE 15

Preparation of $Ba_{0.992}Ca_{0.008}FBr:0.005Eu, 0.00014K,0.003Li$ (1) 1200 mL of aqueous BaBr$_2$ solution (2.5 mol/L), 37.5 mL of aqueous EuBr$_3$ solution (0.2 mol/L), 30.9 g of KBr, 3.54 g of CaBr$_2$·2H$_2$O and 1762.5 mL of water was placed in a 4,000 mL-volume reactor. The mother reaction liquid (concentration of BaBr$_2$:1.00 mol/L) in the reactor was kept at 60° C. and stirred with a screw-type stirrer (diameter: 60 mm) at 5000 r.p.m.

300 mL of aqueous NH$_4$F solution (5 mol/L) was introduced into the mother liquid under stirring at 60° C. at a rate of 5.0 mL/minute by means of a roller pump, to form a precipitate. After that, the mother liquid was further stirred at 60° C. for 2 hours to ripen the precipitate. The ripened precipitate was filtered off, washed with 2 L of methanol and dried in vacuo at 120° C. for 4 hours to obtain 350 g of a precursor crystalline product of the phosphor (hereinafter referred to as "BFB crystals"). The obtained precursor crystalline product was observed with a scanning electron microscope to find that most of the crystalline particles had tetradecahedral shape. The mean grain size of the crystalline particles was also measured with a grain size distribution analyzer of light diffraction type (Horiba, Ltd.: LA-500) and found to be 4.8 μm.

(2) 1.0 g of alumina in the form of super-fine grain powder, 200 g of BFB crystals and 0.23 g of LiBr were well mixed by means of a mixer so that the alumina powder might be uniformly attached to the surface of the crystal products and the alumina powder prevents the crystalline particles from deformation and/or agglomeration caused by sintering in the firing process to keep the initial grain size distribution. 100 g of the prepared mixture was placed in an alumina boat, and was fired in a tube furnace at 850° C. for 3 hours under an atmosphere of nitrogen gas containing 0.3% oxygen to obtain the desired europium activated barium fluorobromide phosphor particles. The obtained phosphor particles were observed with the scanning electron microscope to find that most of the particles had the same tetradecahedral shape as the precursor crystalline product.

EXAMPLE 16

Preparation of Ba$_{0.992}$Ca$_{0.008}$FBr:0.005Eu, 0.00006K,0.003Li

The procedure of Example 15 was repeated except that the amount of KBr was changed to 3.09 g in the step (1) to prepare the desired europium activated barium fluorobromide phosphor particles of tetradecahedral type.

EXAMPLE 17

Preparation of Ba$_{0.992}$Ca$_{0.008}$FBr:0.005Eu,0.001K, 0.003Li

The procedure of Example 15 was repeated except that the amount of KBr was changed to 154.5 g in the step (1) to prepare the desired europium activated barium fluorobromide phosphor particles of tetradecahedral type.

EXAMPLE 18

Preparation of Ba$_{0.992}$Ca$_{0.008}$FBr:0.005Eu,0.00014K

The procedure of Example 15 was repeated except that LiBr was not added in the step (2) to prepare the desired europium activated barium fluorobromide phosphor particles of tetradecahedral type.

EXAMPLE 19

Preparation of Ba$_{0.992}$Ca$_{0.008}$FBr:0.005Eu, 0.00014K,0.0003Li

The procedure of Example 15 was repeated except that the amount of LiBr was changed to 0.023 g in the step (2) to prepare the desired europium activated barium fluorobromide phosphor particles of tetradecahedral type.

EXAMPLE 20

Preparation of Ba$_{0.992}$Ca$_{0.008}$FBr:0.005Eu, 0.00014K,0.009Li

The procedure of Example 15 was repeated except that the amount of LiBr was changed to 0.69 g in the step (2) to prepare the desired europium activated barium fluorobromide phosphor particles of tetradecahedral type.

EXAMPLE 21

Preparation of Ba$_{0.999}$Ca$_{0.001}$FBr:0.005Eu, 0.00014K,0.003Li

The procedure of Example 15 was repeated except that the amount of CaBr.2H$_2$O was changed to 0.35 g in the step (1) to prepare the desired europium activated barium fluorobromide phosphor particles of tetradecahedral type.

EXAMPLE 22

Preparation of Ba$_{0.970}$Ca$_{0.030}$FBr:0.005Eu, 0.00014K,0.003Li

The procedure of Example 15 was repeated except that the amount of CaBr.2H$_2$O was changed to 10.61 g in the step (1) to prepare the desired europium activated barium fluorobromide phosphor particles of tetradecahedral type.

EXAMPLE 23

Preparation of Ba$_{0.992}$Ca$_{0.008}$FBr:0.005Eu, 0.00014K,0.003Li

The procedure of Example 15 was repeated except that the amount of alumina in the form of super-fine grain powder was changed to 0.6 g in the step (2) to prepare the desired europium activated barium fluorobromide phosphor particles of tetradecahedral type.

EXAMPLE 24

Preparation of Ba$_{0.992}$Ca$_{0.008}$FBr:0.005Eu, 0.00014K,0.003Li

The procedure of Example 15 was repeated except that the amount of alumina in the form of super-fine grain powder was changed to 2.0 g in the step (2) to prepare the desired europium activated barium fluorobromide phosphor particles of tetradecahedral type.

EXAMPLE 25

Preparation of Ba$_{0.992}$Ca$_{0.008}$FBr:0.0001Eu, 0.00014K,0.003Li

The procedure of Example 15 was repeated except that the concentration of EuBr$_3$ aqueous solution in the step (1) was changed to 0.004 mol/l to prepare the desired europium activated barium fluorobromide phosphor particles of tetradecahedral type.

EXAMPLE 26

Preparation of Ba$_{0.992}$Ca$_{0.008}$FBr:0.010Eu, 0.00014K,0.003Li

The procedure of Example 15 was repeated except that the concentration of aqueus EuBr$_3$ solution in the step (1)

was changed to 0.4 mol/L to prepare the desired europium activated barium fluorobromide phosphor particles of tetradecahedral type.

COMPARISON EXAMPLE 10

Preparation of $Ba_{0.992}Ca_{0.008}FBr:0.005Eu,0.003Li$

The procedure of Example 15 was repeated except that KBr was not added in the step (1) to prepare the desired europium activated barium fluorobromide phosphor particles of tetradecahedral type.

COMPARISON EXAMPLE 11

Preparation of $Ba_{0.992}Ca_{0.008}FBr:0.005Eu,0.0020K, 0.003Li$

The procedure of Example 15 was repeated except that the amount of KBr was changed to 0.21 g in the step (1) to prepare the desired europium activated barium fluorobromide phosphor particles of tetradecahedral type.

COMPARISON EXAMPLE 12

Preparation of $Ba_{0.992}Ca_{0.008}FBr:0.005Eu, 0.00014K,0.003Li$

The procedure of Example 15 was repeated except that the amount of LiBr was changed to 1.20 g in the step (2) to prepare the desired europium activated barium fluorobromide phosphor particles of tetradecahedral type.

COMPARISON EXAMPLE 13

Preparation of $BaFBr:0.005Eu,0.00014K,0.003Li$

The procedure of Example 15 was repeated except that $CaBr_2.2H_2O$ was not added in the step (1) to prepare the desired europium activated barium fluorobromide phosphor particles of tetradecahedral type.

COMPARISON EXAMPLE 14

Preparation of $Ba_{0.950}Ca_{0.050}FBr:0.005Eu, 0.00014K,0.003Li$

The procedure of Example 15 was repeated except that the amount of $CaBr_2.2H_2O$ was changed to 17.69 g in the step (1) to prepare the desired europium activated barium fluorobromide phosphor particles of tetradecahedral type.

COMPARISON EXAMPLE 15

Preparation of $Ba_{0.992}Ca_{0.008}FBr:0.00005Eu, 0.00014K,0.003Li$

The procedure of Example 15 was repeated except that the concentration of aqueous $EuBr_3$ solution in the step (1) was changed to 0.002 mol/L to prepare the desired europium activated barium fluorobromide phosphor particles of tetradecahedral type.

COMPARISON EXAMPLE 16

Preparation of $Ba_{0.992}Ca_{0.008}FBr:0.020Eu, 0.00014K,0.003Li$

The procedure of Example 15 was repeated except that the concentration of aqueous $EuBr_3$ solution in the step (1) was changed to 0.8 mol/L to prepare the desired europium activated barium fluorobromide phosphor particles of tetradecahedral type.

EVALUATION OF EUROPIUM ACTIVATED BARIUM FLUOROBROMIDE PHOSPHOR OF TETRADECAHEDRAL TYPE

Various properties of the europium activated barium fluorobromide phosphors of tetradecahedral type prepared by the above Examples 15–26 and Comparison Examples 10–16 were evaluated in the following manner.

(1) Luminance of Stimulated Emission (Photo-Stimulated Luminance; PSL)

A predetermined amount of the sample phosphor was exposed to X-rays at 80 KVp in an amount of 200 mR, and after 10 seconds, excited with the light of He—Ne laser (wavelength: 633 nm) in an amount of 4.8 $J/m^2$. The stimulated emission emitted by the phosphor having passed through an optical filter (B-410), and was detected by a photomultiplier to measure a luminance of stimulated emission (photo-stimulated luminance; PSL). The measured luminance (PSL) of each phosphor is shown in Table 2 as relative value. A phosphor exhibiting a high PSL value is preferred.

(2) Erasing Property

After the sample phosphor was subjected to the above PSL measurement (1), the phosphor was sequentially irradiated with a light of white fluorescence lamps through a sharpcut optical filter (SC-46) in an amount of 4,000,000 Lux·second, and then the procedure of the above PSL measurement (1) was repeated except that the phosphor was not exposed to X-rays to measure a PSL value after erasure. The ratio between the PSL value of the measurement (1) (initial PSL) and the PSL value after erasure (PSL after erasure) was calculated. The ratio (PSL after erasure/initial PSL) of each phosphor is shown in Table 2 as erasure value. A phosphor exhibiting a low erasure value is preferred.

(3) Image-Remaining Property

After the above procedure (2) was complete, the phosphor was stored at 60° C. in a dark place for 24 hours and then the procedure of the above PSL measurement (1) was repeated except that the phosphor was not exposed to X-rays to measure a PSL value after storing. The ratio between the PSL value of the measurement (1) (initial PSL) and the PSL value after storing (PSL after storage) was calculated. The ratio (PSL after storage/initial PSL) is shown in Table 2 as image-remaining value. A phosphor exhibiting a low image remaining value is preferred.

(4) Fading Property

After the sample phosphor was subjected to the above PSL measurement (1), the phosphor was stored at 32° C. in a dark place for 1 hour and then the procedure of the above PSL measurement (1) was repeated except that the phosphor was not exposed to X-rays to measure a PSL value after storage. The ratio between the PSL value of the measurement (1) (initial PSL) and the PSL value after storage (PSL after fading) was calculated. The value of the ratio (PSL after fading/initial PSL)×100 is shown in Table 2 as fading value. A phosphor exhibiting a high fading value is preferred.

(5) X-Ray Afterglow

A predetermined amount of the sample phosphor was exposed to X-rays at 80 KVp in an amount of 200 mR. After 15 seconds, the afterglow emitted by the phosphor having passed through an optical filter (B-410), and was detected by a photomultiplier to measure a luminance of afterglow. The value of $\log_{10}$(luminance of afterglow/initial PSL) was calculated to obtain a value of X-ray afterglow. The obtained value of X-ray afterglow is shown in Table 2 in a relative value. A phosphor exhibiting a low value is preferred.

TABLE 2

| | PSL | erasure value | image remaining value | fading value | X-ray afterglow |
|---|---|---|---|---|---|
| Ex.15 | 50 | $4.0 \times 10^{-6}$ | $6.1 \times 10^{-5}$ | 67 | -4.16 |
| Ex.16 | 46 | $5.5 \times 10^{-6}$ | $7.0 \times 10^{-5}$ | 69 | -4.15 |
| Ex.17 | 53 | $2.3 \times 10^{-6}$ | $3.3 \times 10^{-5}$ | 58 | -4.08 |
| Ex.18 | 43 | $3.5 \times 10^{-6}$ | $3.5 \times 10^{-5}$ | 64 | -4.17 |
| Ex.19 | 44 | $2.9 \times 10^{-6}$ | $1.5 \times 10^{-5}$ | 67 | -4.20 |
| Ex.20 | 42 | $8.0 \times 10^{-6}$ | $9.8 \times 10^{-5}$ | 65 | -4.16 |
| Ex.21 | 42 | $6.0 \times 10^{-6}$ | $6.6 \times 10^{-5}$ | 69 | -4.00 |
| Ex.22 | 42 | $7.4 \times 10^{-6}$ | $7.9 \times 10^{-5}$ | 68 | -4.19 |
| Ex.23 | 52 | $3.5 \times 10^{-6}$ | $3.8 \times 10^{-5}$ | 61 | -4.20 |
| Ex.24 | 42 | $4.5 \times 10^{-6}$ | $6.5 \times 10^{-5}$ | 63 | -4.15 |
| Ex.25 | 38 | $8.0 \times 10^{-6}$ | $1.0 \times 10^{-4}$ | 73 | -3.95 |
| Ex.26 | 50 | $3.0 \times 10^{-6}$ | $2.0 \times 10^{-5}$ | 66 | -4.25 |
| C.Ex.10 | 20 | $2.0 \times 10^{-6}$ | $3.5 \times 10^{-5}$ | 85 | -4.15 |
| C.Ex.11 | 57 | $3.5 \times 10^{-6}$ | $5.0 \times 10^{-5}$ | 45 | -3.80 |
| C.Ex.12 | 40 | $3.0 \times 10^{-5}$ | $3.5 \times 10^{-4}$ | 60 | -4.10 |
| C.Ex.13 | 28 | $9.0 \times 10^{-6}$ | $5.0 \times 10^{-5}$ | 72 | -3.68 |
| C.Ex.14 | 33 | $8.0 \times 10^{-6}$ | $7.3 \times 10^{-5}$ | 75 | -4.20 |
| C.Ex.15 | 27 | $2.4 \times 10^{-5}$ | $3.3 \times 10^{-4}$ | 80 | -3.50 |
| C.Ex.16 | 52 | $8.0 \times 10^{-6}$ | $7.5 \times 10^{-5}$ | 49 | -4.10 |

The values in Table 2 show the following facts.

Comparison Example 10 shows that the phosphor containing no potassium exhibits low luminance of stimulated emission.

Comparison Example 11 shows that the phosphor containing too much potassium exhibits unpreferable properties with respect to fading property and X-ray afterglow.

Comparison Example 12 shows that the phosphor containing too much lithium exhibits unpreferable properties with respect to erasing property and image-remaining property.

Comparison Example 13 shows that the phosphor containing no calcium exhibits low luminance of stimulated emission and unpreferable property in view of X-ray afterglow.

Comparison Example 14 shows that the phosphor containing too much calcium also exhibits low luminance of stimulated emission.

Comparison Example 15 shows that the phosphor containing too less europium exhibits low luminance of stimulated emission and unpreferable properties with respect to erasing property, image-remaining property and X-ray afterglow.

Comparison Example 16 shows that the phosphor containing too much europium exhibits unpreferable fading property.

Examples of the radiation image storage panel of the invention are as follows.

EXAMPLE 27

As materials of a phosphor layer, 356 g of the potassium added europium activated barium fluorobromide phosphor of tetradecahedral type prepared in Example 1, 15.8 g of polyurethane resin (Desmolac 4125, product of Sumitomo Bayer Urethane Co., Ltd.) and 2.0 g of an epoxy resin of Bisphenol A type were added to a mixture solvent of methyl ethyl ketone and toluene (methyl ethyl ketone:toluene=1:1), and they were mixed using a propeller mixer to prepare a coating dispersion having a viscosity of 25 to 30 PS. The prepared coating dispersion was then applied on a support beforehand provided with a subbing layer by means of a doctor blade, and dried at 100° C. for 15 minutes to form a phosphor layer (thickness: 200 μm).

As materials of a protective film, 70 g of a fluororesin (fluoroolefin-vinyl ether copolymer: Lumiflon LF100, product of Asahi Glass Co., Ltd.), 25 g of isocyanate crosslinking agent (Desmodule Z4370, product of Sumitomo Bayer Urethane Co., Ltd.), 5.0 g of an epoxy resin of Bisphenol A type and 10 g of silicon resin fine powder (grain size: 1–2 μm; KMP-590, product of The Shin-Etsu Chemical Co., Ltd.) were added to a mixture solvent of toluene and isopropyl alcohol (toluene:isopropyl alcohol=1:1) to prepare a coating dispersion for protective film. The prepared coating dispersion was then applied on the above-prepared phosphor layer by means of a doctor blade, and heated to harden at 120° C. for 30 minutes to form a protective film (thickness: 10 μm).

Thus, the radiation image storage panel of the invention was produced.

EXAMPLE 28

The procedure of Example 27 was repeated except for employing the potassium added europium activated barium fluorobromide phosphor of tetradecahedral type prepared in Example 15, to produce a radiation image storage panel of the invention.

What is claimed is:

1. A rare earth activated alkaline earth metal fluorohalide stimulable phosphor in the form of tetradecahedral particles represented by the following formula (I):

$$Ba_{1-x}Ca_xFBr_{1-y}I_y \cdot aEu, bK, cCs \qquad (I)$$

in which $0<x \leq 0.03$, $0<y \leq 0.30$, $0.0001 \leq a \leq 0.01$, $0<b \leq 0.001$, and $0 \leq c \leq 0.001$, respectively.

2. The rare earth activated alkaline earth metal fluorohalide stimulable phosphor of claim 1, wherein the numbers of x, y, a, b and c in the formula (I) satisfy the conditions of $0.001 \leq x \leq 0.03$, $0.10 \leq y \leq 0.20$, $0.001 \leq a \leq 0.01$, $0<b \leq 0.0003$ and $0<c \leq 0.0001$, respectively.

3. A radiation image storage panel employing the rare earth activated alkaline earth metal fluorohalide stimulable phosphor in the form of tetradecahedral particles represented by the following formula (I):

$$Ba_{1-x}Ca_xFBr_{1-y}I_y \cdot aEu, bK, cCs \qquad (I)$$

in which $0<x \leq 0.03$, $0<y \leq 0.30$, $0.0001 \leq a \leq 0.01$, $0<b \leq 0.001$, and $0 \leq c \leq 0.001$, respectively.

4. A rare earth activated alkaline earth metal fluorohalide stimulable phosphor in the form of tetradecahedral particles represented by the following formula (II):

$$Ba_{1-x}Ca_xFBr_{1-y}I_y \cdot aEu, bK, cLi \qquad (II)$$

in which $0<x \leq 0.03$, $0 \leq y \leq 0.30$, $0.0001 \leq a \leq 0.01$, $0<b \leq 0.001$, and $0<c \leq 0.01$, respectively.

5. The rare earth activated alkaline earth metal fluorohalide stimulable phosphor of claim 4, wherein the numbers of x, y, a, b and c in the formula (II) satisfy the conditions of $0.001 \leq x \leq 0.03$, $y=0$, $0.001 \leq a \leq 0.01$, $0.00001 \leq b \leq 0.001$ and $0<c \leq 0.01$, respectively.

6. A radiation image storage panel employing the rare earth activated alkaline earth metal fluorohalide stimulable phosphor in the form of tetradecahedral particles represented by the following formula (II):

$$Ba_{1-x}Ca_xFBr_{1-y}I_y \cdot aEu, bK, cLi \qquad (II)$$

in which $0<x \leq 0.03$, $0 \leq y \leq 0.30$, $0.0001 \leq a \leq 0.01$, $0<b \leq 0.001$, and $0<c \leq 0.01$, respectively.

* * * * *